April 8, 1969 M. W. HINZ 3,437,296
TREE HOLDING APPARATUS
Filed May 5, 1967
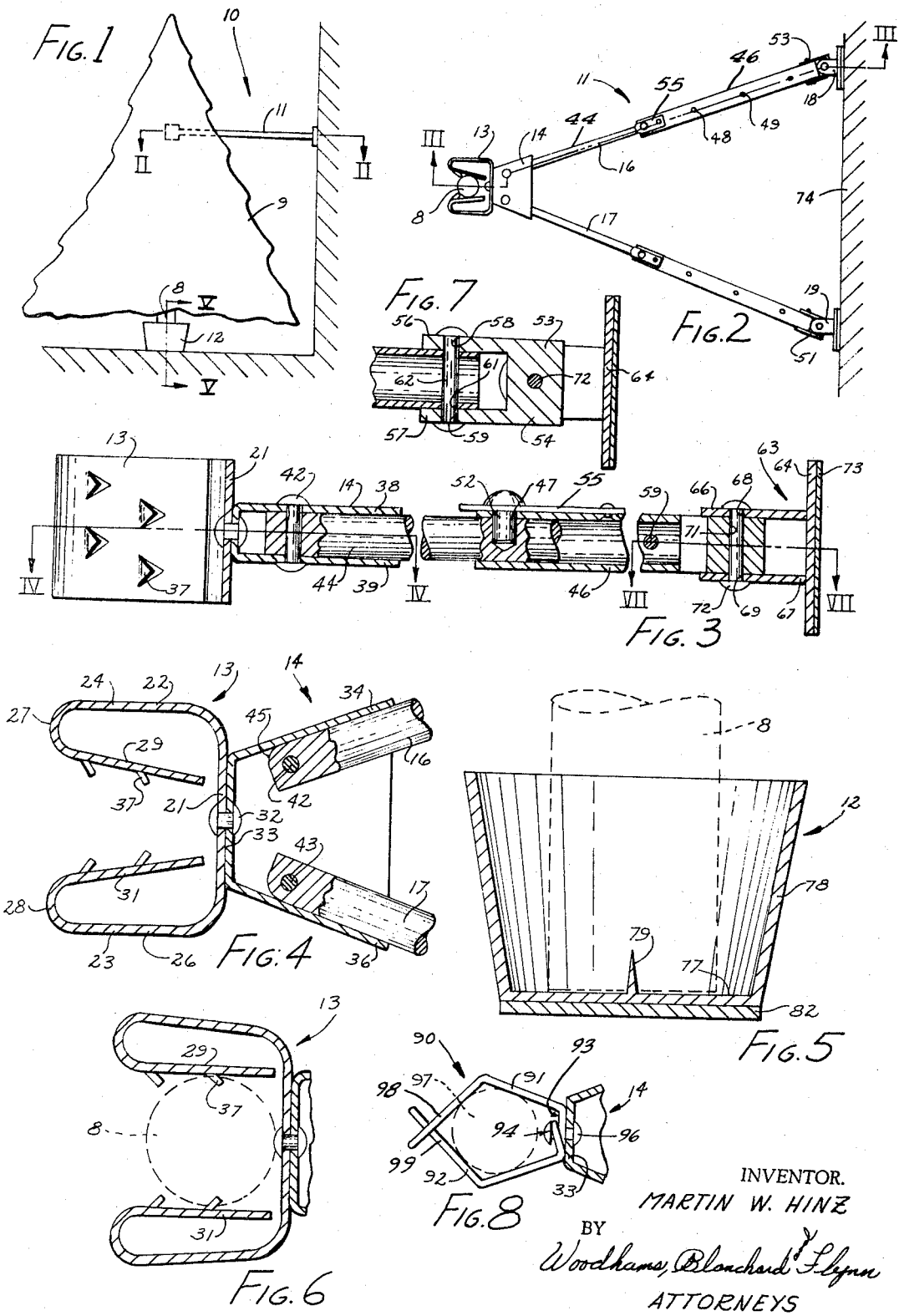
INVENTOR.
MARTIN W. HINZ
BY
Woodhams, Blanchard & Flynn
ATTORNEYS 3,437,296
TREE HOLDING APPARATUS
Martin W. Hinz, Geneva Township, Van Buren County,
Mich. (R.R. 5, South Haven, Mich. 49090)
Filed May 5, 1967, Ser. No. 636,502
Int. Cl. A47g 33/12
U.S. Cl. 248—38                                      4 Claims

ABSTRACT OF THE DISCLOSURE

A pair of elongated elements are pivotally attached near one end of each to an assembly including a substantially U-shaped member for releasably gripping an object, such as the trunk of a tree, at a point spaced from the ends thereof. The other ends of said elongated elements have means thereon for causing the elements to adhere to a surface, such as a wall. Container means receives the lower end of the object and includes both internal and external gripping means for preventing relative movement between the lower end of the object and the surface supporting the container means.

Background of the invention

Although a great many attempts have been made over a long period of time to develop a satisfactory apparatus for supporting a Christmas tree, all such previous attempts have for one or more reasons failed to be completely satisfactory. By far the majority of these previous attempts have involved some form of standard which, generally speaking, produces one or both of two undesirable results. A typical standard must be designed so that it will not permit the tree to tip over and this necessarily results in a large conspicuous and usually unsightly piece of equipment. Moreover, most existing standards necessitate removal of a substantial number of the lower limbs on the tree in order to afford a firm grip of the butt.

It is generally concended that a Christmas tree will hold its needles, and thereby retain its beauty, for a longer period of time if the butt of the trunk is immersed in water. However, with existing tree standards capable of providing a liquid container for the tree butt, the problems of limb removal or unsightliness, mentioned above, are usually aggravated.

On the other hand, if the trunk of the tree could be engaged at a point substantially above the butt thereof and held against horizontal movement, then the problems encountered by and resulting from the use of conventional tree standards would be eliminated while still permitting the desired watering of the butt.

Accordingly, a primary object of this invention has been the provision of an improved Christmas tree holding apparatus in which the tree trunk is engaged at a point spaced substantially from the butt thereof by means which readily extend through the branches of the tree without detection and for anchoring upon a wall or the like, said apparatus including a container for receiving a liquid and the butt of the tree immersed therein whereby there is no need to remove substantial numbers of limbs from the lower end of the tree trunk, which limbs can thereby cover and hide such container in a manner which appears natural and normal.

A further object of this invention has been the provision of a Christmas tree holding apparatus, as aforesaid, which without modification is capable of engaging tree trunks in a variety of sizes and shapes and of being attached to supporting means, such as an upright wall or the like which can be disposed in different positions and which can have different types of surfaces.

A further object of this invention is the provision of a tree-holding device, as aforesaid, which is inconspicuous, easy to assemble and use, foolproof in operation and relatively inexpensive to manufacture.

Other objects and purposes of this invention will become apparent to persons familiar with this type of equipment upon reading the following descriptive material and examining the accompanying drawings, in which:

FIGURE 1 is a side elevational view of a Christmas tree supported by the tree-holding apparatus of the invention.

FIGURE 2 is a sectional view taken along the line II—II in FIGURE 1.

FIGURE 3 is a sectional view taken along the line III—III in FIGURE 2.

FIGURE 4 is a sectional view taken along the line IV—IV in FIGURE 1.

FIGURE 5 is a sectional view taken along the line V—V in FIGURE 1.

FIGURE 6 is a fragment of FIGURE 4 with parts thereof in different positions of operation.

FIGURE 7 is a sectional view taken along the line VII—VII in FIGURE 3.

FIGURE 8 includes a top view of an alternate gripping member.

For the purpose of convenience in description, the terms "upper," "lower" and words of similar import will have reference to the structure of the invention and parts associated therewith as appearing in FIGURES 1 and 3. The terms "inner," "outer" and words of similar import will have reference to the geometric center of said apparatus and parts thereof, and with respect to the tree supported by the apparatus.

Description

The tree-holding apparatus 10, as illustrated in FIGURES 1 and 2, has a support assembly 11 and a base or container 12 for engaging the trunk 8 of a tree 9. The support assembly 11 is spaced from the container 12 and has a gripping member 13, a pivot member 14, a pair of elongated, telescoping arms or elements 16 and 17 and a pair of attaching brackets 18 and 19.

The gripping member 13 (FIGURES 3 and 4) may be constructed of a resiliently flexible material, such as spring steel, and has a plate 21 and a pair of U-shaped portions 22 and 23. Portion 22, for example, has an outer leg 24 which at its inner end is integral with plate 21. Said leg 24 is connected by bight 27 to leg 29. Portion 23 has legs 26 and 29 and a bight 28. Legs 29 and 31 are provided with a plurality of relatively sharp inwardly projecting teeth 37, which extend toward the plate 21.

The gripping member 13 (FIGURES 3 and 4) is attached to pivot member 14 by conventional means, such as rivet 32, preferably so that member 14 can pivot relative to gripping member 13. Pivot member 14 has a plate 33 through which rivet 32 extends and a pair of diverging side walls 34 and 36, which define an include angle of approximately 45 degrees in this embodiment. Pivot member 14 has substantially parallel upper and lower walls 38 and 39 which are integral with plate 33 and side walls 34 and 36. Pivot member 14 may be constructed of any suitable material, such as metal or plastic.

The elongated elements 16 and 17 are attached by rivets 42 and 43 to the pivot member 14 (FIGURE 4) so that said elements 16 and 17 may pivot relative to member 14 around parallel axes transverse of the axis provided by rivet 32. The elongated elements 16 and 17 are preferably identical, and have at least two telescoped parts. Element 16 has a relatively long slender rod part 44 which is slideably received and held in hollow part 46. Part 44 has a rounded corner 45 on its inner end to facilitate pivotal movement, and a hole 47 through its outer end which may be aligned with any of the recesses 48 and 49, for example, in part 46. The length of the telescoped element 16 is controlled by permitting the pin 52, which is disposed in hole 47, to drop into the appropriate recess 48 or 49 under the urging of the resiliently flexible strip 55 by which said pin 52 is secured to the part 44.

Members 16 and 17 are attached at their corresponding outer ends to brackets 18 and 19 (FIGURE 2), which are preferably identical, by means of U-shaped members 53 and 51, respectively. Member 53 has a thickened bight 54 and a pair of legs 56 and 57. The distance between legs 56 and 57 is slightly greater than the external diameter of the adjacent end of part 46. Legs 56 and 57 are provided with holes 58 and 59, respectively, which are alignable with hole 61 in part 46. A rivet 62 extends through holes 58, 59 and 61 to provide an axis on which portion 53 may pivot relative to part 46.

The U-shaped member 53 is pivotally attached to the wall-engaging bracket 18, which has a plate 64 and a pair of integral flanges 66 and 67, the space between said flanges being such that U-shaped member 53 may be pivotally disposed therebetween. Legs 66 and 67 have holes 68 and 69, respectively, which are alignable with hole 71 in the thickened bight 54 of member 53. A rivet 72 extends through holes 68, 69 and 71 so that member 53 can pivot relative to bracket 63 around an axis transverse to the pivotal axis provided by rivet 62. The member 53 cooperates between part 46 and bracket 18 to produce, in effect, a universal connection.

Plate 63 is provided with a layer of adhesive material 73 by which the bracket 18 may be firmly, yet removably, secured to wall 74.

Container 12 (FIGURE 5) may be relatively shallow and is preferably substantially larger in diameter than the base of the tree trunk 8. Said container has a bottom wall 77 with an upwardly diverging side wall 78. Means, such as an upwardly extending pin 79, projects upwardly from the bottom wall 77 to engage the trunk 8 and thereby prevent displacement of the lower end of tree 76. A nonskid coating or sheet 82 is attached to the lower surface of the bottom wall 77 to prevent lateral displacement of the container 12.

*Operation*

Although the operation of the tree-holding apparatus 10 is indicated above, it will be described in further detail hereinbelow. The trunk 8 of a Christmas tree 9 is first placed in the container 12 directly above projection 79 and is then forced downward causing projection 79 to penetrate the butt of said tree. The upper portion of the trunk 8 is forced between portions 22 and 23 (FIGURE 6) of gripping member 13 whereby at least the legs 29 and 31 are bent outwardly. Since portions 22 and 23 are constructed of resilient material, the gripping member 13 is capable of engaging trunks of different sizes. Where the trunk is relatively large, legs 24 and 26 may also be flexed outwardly.

When the trunk thusly is engaged, teeth 37 grip said trunk and thereby prevent accidental disengagement. The telescoping elements 16 and 17 can now be pivoted away from each other until they engage the side walls 34 and 36, respectively, of member 14. Elements 16 and 17 may then be adjusted to the appropriate lengths after which the brackets 18 and 19 are secured to wall 73. When it is desired to disengage the tree from the tree-holding apparatus 10, the legs 29 and 31 are manually separated, thereby releasing the trunk 8 from the grip of teeth 37.

The universal characteristic provided by the members 53 and 51 in addition to the pivotal connection between the gripping member 13 and pivot member 14 permit use of the apparatus 10 in association with trunks of unusual shapes and walls of irregular contours. In fact, the gripping member can be attached to a branch of a tree or to some other type of article, such as a pole lamp, if desired.

*Alternate structure*

FIGURE 8 illustrates an alternate gripping member 90 which is preferably fabricated from resiliently flexible wire rod having physical characteristics preferably at least approaching those of spring steel. The gripping member 90 has a pair of V-shaped arms 91 and 92 which are integral at their inner ends with the opposite ends of the base portion 93 which has an integral loop 94. The gripping member 90 is secured to the plate 33 of a pivot member 14 by means of a rivet 96, or the like, which extends through the loop 94 so that the gripping member 90 can swivel around the axis of the rivet 96. The loop 94 may facilitate flexing of the arms 91 and 92 away from each other in a direction substantially perpendicular to the plane defined by the arms in their normal position of rest.

In attaching the gripping member 90 to a tree trunk 97, the member 90 is preferably positioned in a plane approximately parallel with said trunk. The two, transverse outer portions 98 and 99 of the arms 91 and 92, respectively, are then moved laterally away from each other in a direction preferably perpendicular to the plane defined by said arms. The gripping member is then moved toward the trunk 97 of the tree so that said trunk can slide between the arms 91 and 92 with a minimum of flexing of said arms, after which the member 90 is rotated 90 degrees into its position as shown in FIGURE 8 for snugly embracing the tree trunk. Detachment of the gripping member 90 from the tree trunk 97 can be effected by merely reversing the foregoing operation.

Although particular preferred embodiments of the invention have been described above in detail for illustrative purposes, it will be recognized that variations or modifications of such disclosures are fully contemplated.

The embodiments of the invention in which an exclusive property or privilege is claimed are defined as follows:

1. An apparatus for holding an object upon a surface in an upright position wherein said object has an engageable portion spaced from the lower end thereof, the combination comprising:
   a gripping member for attachment to said engageable portion;
   a pivot member connected to said gripping member for movement around a first axis;
   a pair of elongated elements pivotally mounted upon said pivot member, each element being movable around an axis transverse of said first axis to positions defining an included angle not materially in excess of 90 degrees;
   attaching means connected to the end of each element remote from said pivot member for removably attaching said element to a surface spaced from said portion of said object.

2. An apparatus according to claim 1, wherein said gripping member has plate means pivotally connected to said pivot member and a pair of resiliently flexible, U-shaped portions with the outer leg of each attached to opposite ends of said plate means, said U-shaped members opening toward said plate means and extending in substantially the same direction therefrom, the inner leg of each U-shaped member having integral grip portions extending therefrom toward each other.

3. An apparatus according to claim 1, wherein said elongated elements are pivotally mounted upon said pivot member for movement around spaced parallel axes;
   wherein said pivot member has spaced walls parallel with said axes and diverging away from said plate means, said pivot axes being adjacent said plate means and the pivotal movement of said elements being limited by said side walls;
   wherein each elongated element comprises a pair of telescoped parts, the parts in each pair being adjustable lengthwise of each other; and
   wherein the ends of said elements remote from said pivot member are universally connected to said attaching means, which is a pressure-sensitive adhesive.

4. An apparatus according to claim 1, wherein said gripping member is fabricated from resiliently flexible and metallic rod means, said gripping member having a base portion including a loop and a pair of V-shaped arms integral with and extending in substantially the same direction from the opposite ends of said base portion, the outer end portions of said arms being in substantially transverse positions whereby said arms and said base portion define an enclosure for the engageable portion of the object; and pivot pin means extending through said loop and secured ot said plate means for pivotally mounting said gripping member on said plate means.

References Cited
UNITED STATES PATENTS

| | | |
|---|---|---|
| 826,124 | 7/1906 | Soseman _____ 248—354 X |
| 1,855,762 | 4/1932 | Kaminski _____ 248—44 |
| 2,612,695 | 10/1952 | Schneider et al. _____ 248—44 |
| 2,931,604 | 4/1960 | Weddle _____ 248—44 |
| 2,933,165 | 4/1960 | Rose _____ 248—43 X |
| 3,059,883 | 10/1962 | Matthiessen _____ 248—351 X |

ROY D. FRAZIER, *Primary Examiner.*

FRANK DOMOTOR, *Assistant Examiner.*

U.S. Cl. X.R.

248—44, 354